United States Patent
Imayama et al.

(10) Patent No.: US 7,042,544 B2
(45) Date of Patent: May 9, 2006

(54) DISPLAY DEVICE

(75) Inventors: Hirotaka Imayama, Mobara (JP);
Masateru Morimoto, Mobara (JP);
Masahiro Ishii, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 11/193,449

(22) Filed: Aug. 1, 2005

(65) Prior Publication Data

US 2005/0264748 A1    Dec. 1, 2005

Related U.S. Application Data

(63) Continuation of application No. 10/649,684, filed on Aug. 28, 2003, now Pat. No. 6,940,576.

(30) Foreign Application Priority Data

Sep. 6, 2002    (JP) .............................. 2002-260884

(51) Int. Cl.
*G02F 1/1339*    (2006.01)
*G02F 1/1341*    (2006.01)
(52) U.S. Cl. ...................... 349/153; 349/154
(58) Field of Classification Search ................ 349/153, 349/154, 189, 190
See application file for complete search history.

(56) References Cited

U.S. PATENT DOCUMENTS

| | | | |
|---|---|---|---|
| 5,798,813 A | | 8/1998 | Ohashi et al. |
| 6,144,435 A | * | 11/2000 | Yokoyama et al. ......... 349/133 |
| 6,678,029 B1 | * | 1/2004 | Suzuki ....................... 349/154 |
| 6,705,584 B1 | | 3/2004 | Hiroshima et al. |

FOREIGN PATENT DOCUMENTS

JP        2001-075107        9/1999

* cited by examiner

*Primary Examiner*—Toan Ton
*Assistant Examiner*—Tai Duong
(74) *Attorney, Agent, or Firm*—Reed Smith LLP; Stanley P. Fisher, Esq.; Juan Carlos A. Marquez, Esq.

(57) ABSTRACT

Sealing materials are formed in a reliable manner without the occurrence of peeling-off thereof. Between respective substrates which are arranged to face each other with liquid crystal inserted therebetween, the sealing materials which fix another substrate to one substrate while being used for sealing the liquid crystal are formed and a plurality of liquid crystal filling ports are formed in the sealing material. Further, a width of the sealing material having the shortest length out of respective sealing materials which connect between respective liquid crystal filling ports is made longer than widths of other sealing materials.

8 Claims, 10 Drawing Sheets

DISPLAY DEVICE

This application is a Continuation application of nonprovisional U.S. application Ser. No. 10/649,684 filed on Aug. 28, 2003 now U.S. Pat. No. 6,940,576. Priority is claimed based upon U.S. application Ser. No. 10/649,684 filed on Aug. 28, 2003, which claims the priority date of Japanese Patent application 2002-260884 filed on Sep. 6, 2002, all of which are incorporated by reference herein.

BACKGROUND OF THE INVENTION

A liquid crystal display device is constituted such that an envelope is formed by a pair of substrates and liquid crystal is inserted between a pair of substrates, wherein a large number of pixels are formed in the spreading direction of the liquid crystal.

The liquid crystal inserted between a pair of substrates is sealed between the respective substrates by a sealing material which is also served for fixing another substrate to one substrate.

Further, a liquid crystal filling port for sealing the liquid crystal between respective substrates is formed in one portion of the sealing material. The liquid crystal filling port is sealed by a stopper material after sealing the liquid crystal so that a trace of the liquid crystal sealing port remains.

It is needless to say that by increasing the adhesive strength of the sealing material with respect to respective substrate sides, the reliability of sealing of the liquid crystal can be enhanced.

Recently, along with large-sizing of the liquid crystal display device, a liquid crystal display device which is provided with two or more liquid crystal filling ports has been known.

In this case, sealing of the liquid crystal is performed such that a plurality of respective liquid crystal filling ports are usually formed in parallel at one sides of respective substrates. This is because, as a liquid crystal filling method, usually adopted is a method in which the inside of respective substrates (referred to as "cell") which are fixed by the sealing material is evacuated, the liquid crystal sealing ports are brought into contact with a free surface of the liquid crystal and thereafter, the cell is exposed to atmosphere.

However, with respect to the liquid crystal display device having such a constitution, it has been found that the adhesive strength of the sealing material with respect to respective substrates is not sufficient due to the occurrence of peeling-off of the sealing material and hence, an enhancement of the adhesive strength is requested.

Here, upon reviewing a portion of the sealing material where the adhesive strength is not sufficient, it becomes apparent that such a portion is present in the sealing material having a short length out of respective sealing materials which connect between a plurality of respective liquid crystal filling ports.

The present invention has been made in view of such circumstances and it is an object of the present invention to provide a display device which can form reliable sealing materials without generating a peeling-off phenomenon.

BRIEF SUMMARY OF THE INVENTION

To briefly explain the summary of the typical inventions among inventions disclosed in the present application, they are as follows.

According to one aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that a width of the sealing material having a longest length out of respective sealing materials which connect between respective liquid crystal filling ports is made smaller than a width of other sealing materials. That is, to increase the width of the short sealing materials out of respective sealing materials which connect between respective liquid crystal filling ports, the width of the sealing material having the relatively longest sealing material is decreased.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that a width of the sealing materials having a short length (at least a width of the shortest sealing material) out of respective sealing materials which connect between respective liquid crystal filling ports is made larger than a width of the sealing materials other than the short sealing materials (at least a width of the longest sealing material).

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that in the vicinity of a liquid crystal side of the sealing material having a short length out of respective sealing materials which connect between respective liquid crystal filling ports, an auxiliary sealing material is formed in parallel with the sealing material.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that in the vicinity of a liquid crystal side of the first sealing material having a short length out of respective sealing materials which connect between respective liquid crystal filling ports, an auxiliary sealing material is formed in parallel with the first sealing material, and at least both ends of the auxiliary sealing material are connected to the first sealing material.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that the sealing material having a short length out of respective sealing materials which connect between respective liquid crystal filling ports is constituted in a pattern having a locus which sequentially moves at both sides of an imaginary line which connects between respective liquid crystal filling ports.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that an organic material layer is formed on a liquid crystal side surface of at least one substrate out of the respective substrates.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that an organic material layer is formed on a liquid crystal side surface of at least one substrate out of the respective substrates and, at the same time, the organic material layer which is formed in a portion of the sealing material having the short length out of respective sealing materials which connect between respective liquid crystal filling ports and the vicinity thereof is removed.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that an organic material layer is formed on a liquid-crystal-side surface of at least one substrate out of the respective substrates and, at the same time, in a portion of the sealing material having the short length out of respective sealing materials which connect between respective liquid crystal filling ports and the vicinity thereof, grooves which cross the sealing material are formed in parallel to the direction of the sealing material.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that the sealing material having a short length out of the sealing materials which connect between respective liquid crystal filling ports is formed of a material having an elastic constant which is smaller than an elastic constant of the sealing materials other than the sealing material.

According to another aspect of the present invention, the display device according to the present invention is, on the premise of the constitution of the above aspect, characterized in that out of the sealing materials which connect between respective liquid crystal filling ports, the sealing material having a short length is formed of at least one of polyurethane-based material, polysulfite-based material or epoxy-based material, while the sealing materials other than the sealing material is formed of the epoxy-based material.

According to another aspect of the present invention, a display device according to the present invention is, for example, constituted such that between respective substrates which are arranged to face each other with liquid crystal inserted therebetween, sealing materials which fix another substrate to one substrate while being used for sealing the liquid crystal are formed and a plurality of liquid crystal filling ports are formed in the sealing materials, wherein the improvement is characterized in that the respective sealing materials which are divided by a plurality of liquid crystal filling ports have widths thereof narrowed corresponding to lengths thereof.

The present invention is not limited to the above-mentioned constitutions and various modifications are conceivable without departing from the technical concept of the present invention.

BRIEF DESCRIPTION OF HE SEVERAL VIEWS OF THE DRAWING

DETAILED DESCRIPTION OF THE INVENTION

Hereinafter, embodiments of a liquid crystal display device according to the present invention are explained in conjunction with attached drawings.

Embodiment 1

<<Whole Constitution>>

Figure 16A:
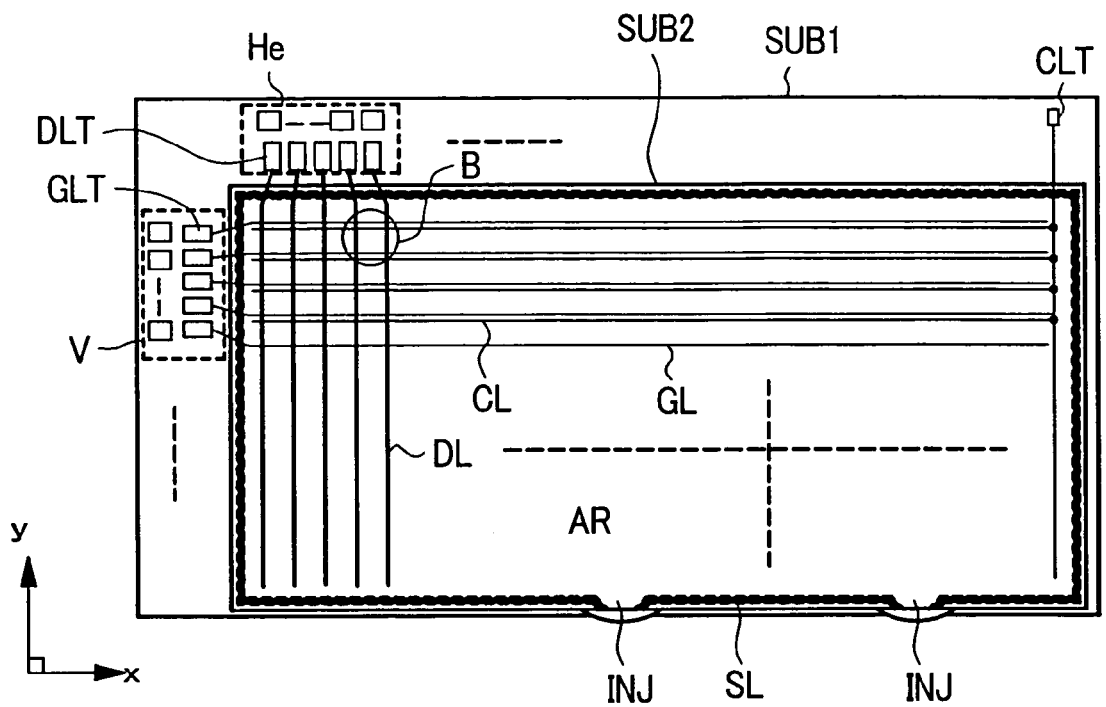
FIG. 16 is a plan view showing the whole of a liquid crystal display device according to the present invention.
Figure 16B:
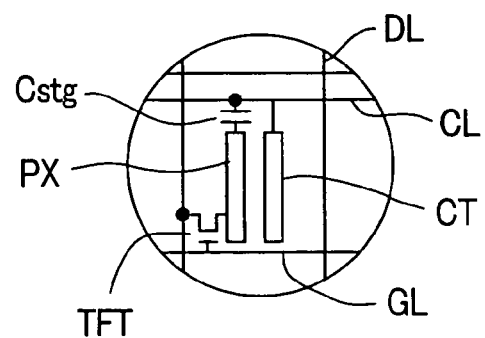

FIG. 16 is a whole constitutional view showing one embodiment of a liquid crystal display device according to the present invention. Further, although FIG. 16 shows an equivalent circuit in part, the drawing is depicted in conformity with an actual geometric arrangement.

There are provided a pair of transparent substrates SUB1, SUB2 which are arranged to face each other with liquid crystal inserted therebetween, wherein the liquid crystal is sealed in a space defined between a pair of transparent substrates SUB1, SUB2 by a sealing material SL which is also served for fixing another transparent substrate SUB2 to one transparent substrate SUB1.

Further, with respect to this sealing materials SL, in a side of the sealing material which faces a region where a video signal driving circuit He explained later is formed, two liquid crystal filling ports INJ are formed. These respective liquid crystal filling ports INJ constitute inlets for allowing filling of the liquid crystal therethrough and are hermetically sealed by a liquid crystal stopper material after filling the liquid crystal.

The reason that two liquid crystal filling ports INJ are formed is to facilitate the filling of the liquid crystal in view of recent large-sizing of the transparent substrates SUB1, SUB2. Accordingly, it is needless to say that two or more liquid crystal filling ports INJ may be provided.

On a liquid-crystal-side surface of the above-mentioned one transparent substrate SUB1 which is surrounded by the sealing material SL, gate signal lines GL which extend in the x direction and are arranged in parallel in the y direction and drain signal lines DL which extend in the y direction and are arranged in parallel in the x direction are formed.

Regions which are surrounded by respective gate signal lines GL and respective drain signal lines DL constitute pixel regions and, at the same time, a mass of these respective pixel regions in a matrix array constitute a liquid crystal display part AR.

Further, with respect to respective pixel regions which are arranged in parallel in the x direction, a common counter voltage signal line CL which runs within respective pixel regions is formed. The counter voltage signal line CL constitutes a signal line which supplies a voltage which becomes the reference with respect to video signals to counter electrodes CT described later.

In each pixel region, a thin film transistor TFT which is operated in response to a scanning signal from the one-side gate signal line GL and a pixel electrode PX to which a video signal is supplied from the one-side drain signal line DL through the thin film transistor TFT are formed.

The pixel electrode PX generates an electric field between the pixel electrode PX and the counter electrode CL which is connected to the counter voltage signal line CL and the optical transmissivity of the liquid crystal is controlled in response to this electric field.

Respective one ends of the gate signal lines GL extend over the sealing material SL and extension ends of the gate signal lines GL constitute terminals GLT to which output terminals of a scanning signal driving circuit V are connected. Further, to input terminals of the scanning signal driving circuit V, signals from a printed circuit board (not shown in the drawing) which is arranged outside a liquid crystal display panel are inputted.

The scanning signal driving circuit V includes a plurality of semiconductor devices, wherein a plurality of gate signal lines GL which are arranged close to each other are grouped and one semiconductor device is allocated to each group.

In the same manner, respective one ends of the drain signal lines DL extend over the sealing material SL and extension ends of the drain signal lines DL constitute terminals CLT to which output terminals of a video signal driving circuit He are connected. Further, to input terminals of the video signal driving circuit He, signals from a printed circuit board (not shown in the drawing) which is arranged outside a liquid crystal display panel are inputted.

The video signal driving circuit He includes a plurality of semiconductor devices, wherein a plurality of drain signal lines DL which are arranged close to each other are grouped and one semiconductor device is allocated to each group.

Further, the counter voltage signal lines CL are connected in common at a right-side end portion in the drawing and a connection line extends over the sealing material SL and an extension end thereof constitutes a terminal CLT. A voltage which constitutes the reference with respect to the video signal is supplied from the terminal.

With respect to respective gate signal lines GL, these lines GL are sequentially selected one after another in response to the scanning signals from the scanning signal driving circuit V.

Further, the video signals are supplied to respective drain signal lines DL by the video signal driving circuit He in conformity with the timing of selection timing of the gate signal lines GL.

Here, in the above-mentioned embodiment, the scanning signal driving circuit V and the video signal driving circuit He are formed of semiconductor devices which are mounted on the transparent substrate SUB1. However, it may be possible to use so-called tape carrier type semiconductor devices which are connected astride the transparent substrate SUB1 and the printed circuit board. Further, when a semiconductor layer of the thin film transistor TFT is formed of polycrystalline silicon (p-Si), the semiconductor devices may be formed such that semiconductor elements constituted of the polycrystalline silicon are formed on the transparent substrate SUB1 together with a wiring layer.

Further, although the pixel electrodes PX and the counter electrodes CT are formed on the same transparent substrate SUB1 side in the above-mentioned embodiment, the counter electrodes CT may be formed on the liquid-crystal-side surface of the transparent substrate SUB2. In this case, usually, the pixel electrode PX is constituted of a transparent conductive layer which is formed over the substantially whole area of the pixel region and the counter electrode CT is also constituted of a transparent conductive layer which is formed in common with respect to respective pixel regions.

<<Sealing Materials>>

Figure 1:
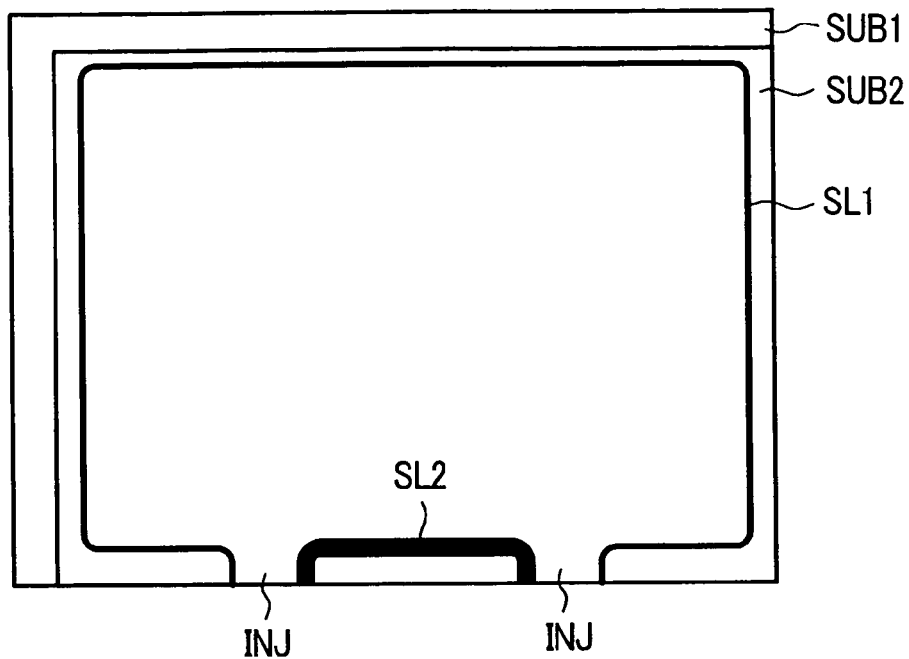
FIG. 1 is a plan view for showing one embodiment of a liquid crystal display device according to the present invention.

FIG. 1 is a view showing the detailed constitution of the above-mentioned sealing materials SL, wherein both of the above-mentioned transparent substrate SUB1 and transparent substrate SUB2 are shown.

Here, in FIG. 1, at liquid crystal filling ports INJ which are formed in the sealing materials SL, liquid crystal stopper materials which plug the liquid crystal filling ports INJ are omitted from the drawing.

When two liquid crystal filling ports INJ are formed in parallel in one of respective transparent substrates SUB1 and SUB2, out side of the sealing materials SL which connect between respective liquid crystal filling ports INJ, a width of the sealing material SL2 having a short length is made larger than a width of the sealing material SL1 other than the sealing material SL2.

Due to such a constitution, out of the sealing materials SL which connect between respective liquid crystal filling ports INJ, the sealing material SL2 having the short length can increase the adhesive strength between the respective substrates SUB1, SUB2 by an amount corresponding to the increase of the width.

Accordingly, it is possible to prevent the occurrence of following phenomenon. That is, for example, in a pre-stage before filling the liquid crystal, when a vacuum state (pressure reduced state) is created by evacuating air through the respective liquid crystal filling ports INJ, in the inside of a space (referred to as "cell" hereinafter) which is surrounded by the respective transparent substrates SUB1, SUB2 and the sealing materials SL, the pressure difference between the inside and the outside of the cell becomes large in the vicinity of respective liquid crystal filling ports INJ and hence, out of the sealing materials SL which connect between the respective liquid crystal sealing ports INJ, the sealing material SL2 having the short length is liable to be easily peeled off.

Here, out of the sealing materials SL which connect between the respective liquid crystal sealing ports INJ, the sealing material SL1 having the long length exhibits a large adhesive strength between the respective substrates SUB1 and SUB2 due to the long length and hence, it is unnecessary to particularly increase the width of the sealing material SL1.

In this manner, by increasing the width of the portion of the sealing material SL of the respective substrates SUB1 and SUB2 which exhibits the weak adhesive strength, it is possible to obviate a drawback that an area of a liquid crystal display part AR is decreased to no purpose. Further, usually, since a video signal driving circuit He and a scanning signal driving circuit V are not formed on a side where the liquid crystal filling ports INJ are formed, it is possible to increase the width of the sealing material SL2 without incurring a loss in terms of space.

Here, the width of the sealing material SL2 having the short length which connects between respective liquid crystal filling ports INJ is set to 1.2 mm and the width of other sealing material SL1 is set to 0.8 mm, for example.

<<Observation>>

FIG. 15 shows an experimental example which exhibits the relationship between the width of the sealing materials SL and the strength against the tension applied to respective transparent substrates which are fixed by the sealing material in the outward and vertical direction.

Figure 15A:
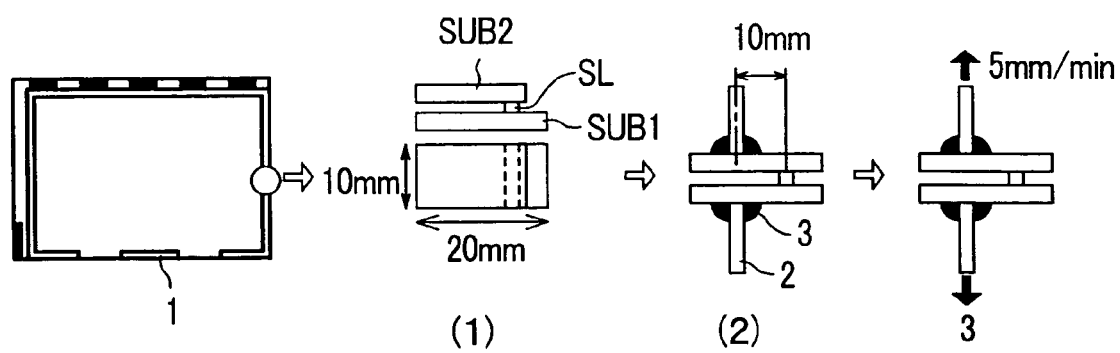
FIG. 15 is an explanatory view for exhibiting an advantageous effect of a liquid crystal display device according to the present invention.

FIG. 15A shows a specific example of the experiment. As shown in the drawing, the adhesive strength of the sealing materials SL is checked such that a portion on which the sealing material SL (arranged between the TFT substrate SUB1 and the CF substrate SUB2) is formed is taken out from the cell 1 ((1) a specimen is cutout), tension jigs 2 are fixed to the respective transparent substrates SUB1 and SUB2 using an adhesive agent 3 ((2) mounting of jigs) and, thereafter, the tension jigs 2 are pulled in the outward and vertical direction ((3) a peeling-off test).

In this case, the experiment is performed by classifying the transparent substrates SUB into a case in which an organic material layer (an organic PAS) is formed on one liquid-crystal-side surface thereof and a case in which an inorganic material layer (an inorganic PAS) is formed on one liquid-crystal-side surface thereof.

Figure 15B:
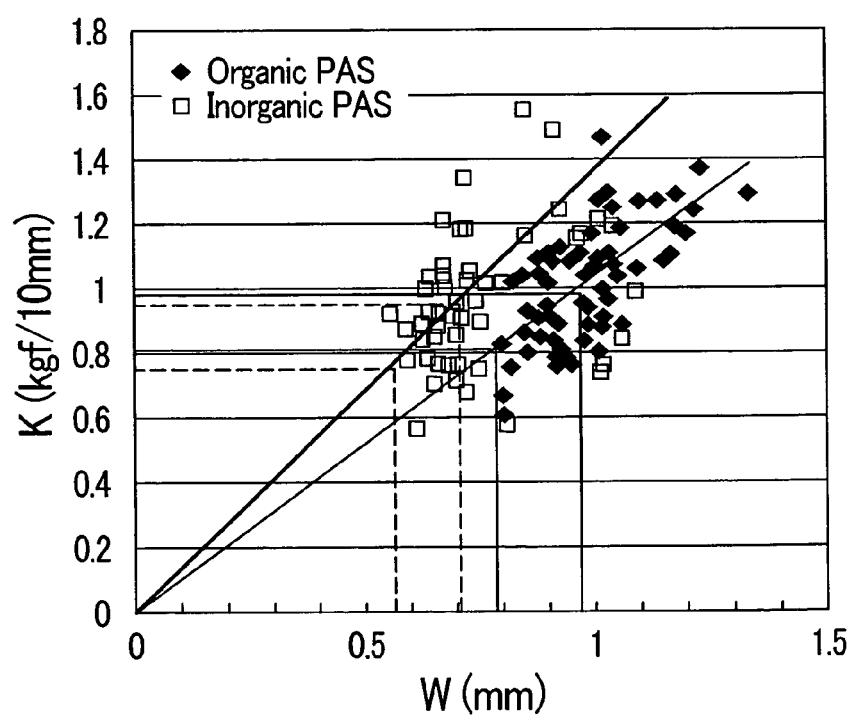

FIG. 15B is a graph showing the adhesive strength of the sealing material SL when the length of the above-mentioned sealing material is set to 10 mm and the width is changed. In the drawing, a tensile test strength K per 10 mm is taken on an axis of ordinate and a seal width W is taken on an axis of abscissas.

It is found that in case the organic material layer is formed on one liquid-crystal-side surface of the above-mentioned transparent substrate SUB, when the width of the sealing material SL is about not more than 1 mm, the sealing peeling-off occurs at the time of filling the liquid crystal, while in case the inorganic material layer is formed on one liquid-crystal-side surface of the above-mentioned transparent substrate SUB, when the width of the sealing material is about not more than 0.7 mm, the sealing peeling-off occurs at the time of filling the liquid crystal.

Based on the result of the experiment, it is apparent that the sealing material SL can enhance the adhesive strength against the transparent substrate SUB by increasing the width thereof and that in case that the organic material layer is formed on one liquid-crystal-side surface of the transparent substrate SUB, the adhesive strength is decreased compared to a case that the organic material layer is not formed.

Here, by physically analyzing the force applied to the sealing material SL, followings are found.

That is, it is found that to the sealing material SL2 having the short length out of respective sealing materials SL which connect between respective liquid crystal filling ports INJ, a peeling-off force (up to 10 N/cm) which is generated due to pressure difference between inside and outside the cell at the time of filling the liquid crystal into the cell and a shearing force which is generated due to bending of the cell attributed to the thermal expansion difference between respective transparent substrates SUB1 and SUB2 are applied, while to the sealing material SL1 other than the sealing material SL2, the above-mentioned peeling-off force is hardly applied and only the shearing force is applied.

From the above, although the strength of the sealing material SL must exhibit a value which exceeds these forces, with respect to the peeling-off force, based on the data shown in FIG. 15B, it is sufficient for the sealing material SL to exhibit the adhesive strength of about 10 N/cm when the width of the sealing material SL is 1 mm. On the other hand, with respect to the shearing force, when the sealing material is an epoxy-based adhesive agent, the shearing force is 400 to 500 times as large as the peeling-off force, that is, the shearing force assumes a value up to 5 kN/cm when the width of the sealing material is 1 mm and no force which exceeds such a force does not act on the sealing material.

Accordingly, with respect to the sealing material SL2 having the short length out of the respective sealing materials which connect between respective liquid crystal filling ports INJ, the adhesive strength of the sealing material SL is determined based on the stress which acts at the time of filling the liquid crystal and this stress is increased corresponding to the increase of the cell size. Accordingly, when the cell size is set to a diagonal size of the 43 cm, it is preferable to set the adhesive strength to about 10 N/cm.

Further, with respect to other sealing material SL1, in view of a role which the other sealing material SL1 plays, it is more important for the other sealing material SL1 to block the liquid crystal from moisture and contaminants outside the cell and it is preferable to set the sealing material SL1 to approximately 0.8 mm irrespective of the size of the cell.

Embodiment 2

Figure 2:
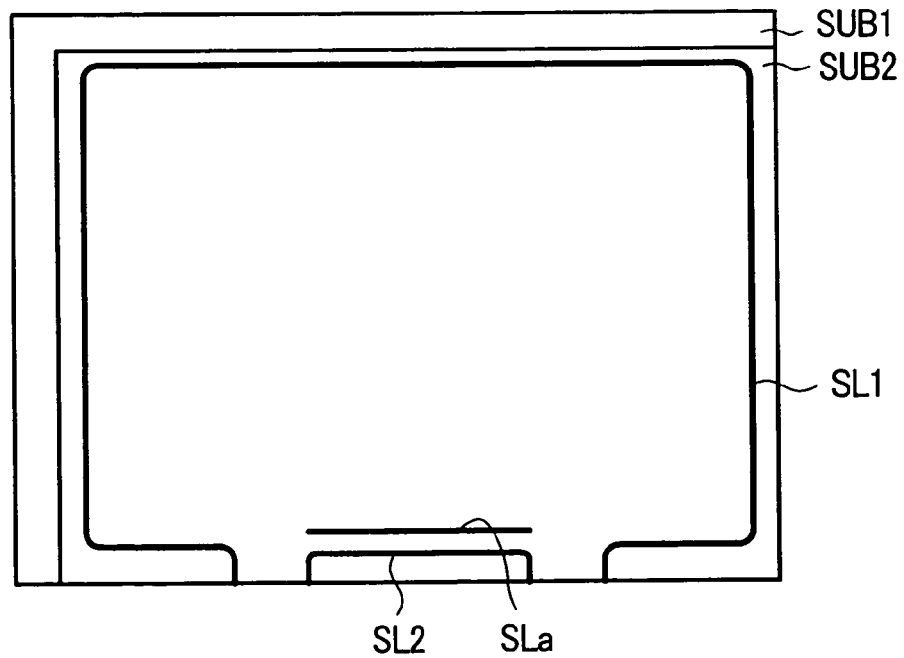
FIG. 2 is a plan view for showing another embodiment of a liquid crystal display device according to the present invention.

FIG. 2 is a constitutional view showing another embodiment of the liquid crystal display device according to the present invention and corresponds to FIG. 1.

The constitution which makes this embodiment different from the embodiment shown in FIG. 1 lies in that the sealing material SL2 having the short length out of the sealing materials SL which connect between respective liquid crystal filling ports INJ is configured to obviate the peeling-off thereof together with the peeling-off of an auxiliary sealing material SLa which is arranged substantially parallel to the sealing material SL2 in the vicinity of the liquid crystal side of the sealing material SL2.

In this case, both of the sealing material SL2 and the auxiliary sealing material SLa have the width thereof set to a value substantially equal to the width of the sealing material SL1 having the long length out of the sealing materials SL which connect between the respective liquid crystal filling ports INJ.

Due to such a constitution, with respect to the above-mentioned sealing material SL2, when a vacuum state (a pressure reduced state) is created by evacuating air from respective liquid crystal filling ports INJ, a stress which acts on the sealing material due to the pressure difference generated between the inside and the outside of the cell in the vicinities of the respective liquid crystal filling ports INJ also acts on the above-mentioned auxiliary sealing material SLa and hence, it is possible to obtain an advantageous effect substantially equal to the advantageous effect obtained by increasing the width of the sealing material SL2.

Embodiment 3

Figure 3:
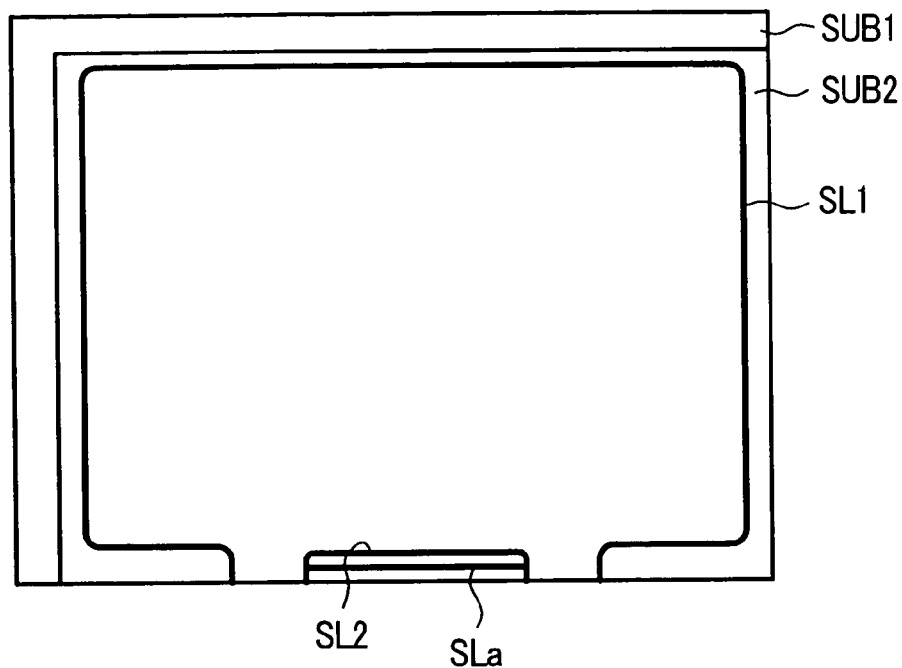
FIG. 3 is a plan view for showing another embodiment of a liquid crystal display device according to the present invention.

FIG. 3 is a constitutional view showing another embodiment of the liquid crystal display device according to the present invention and corresponds to FIG. 2.

The constitution which makes this embodiment different from the embodiment shown in FIG. 2 lies in that the auxiliary sealing material SLa which is arranged substantially parallel to the sealing material SL2 having the short length out of the sealing materials SL which connect between respective liquid crystal filling ports INJ is formed in a pattern in which the auxiliary sealing material SLa has both ends thereof connected to the sealing material SL2.

Due to such a constitution, the sealing material SL2 having the short length out of the sealing materials SL which connect between respective liquid crystal filling ports INJ has a function similar to a function obtained by increasing the width of the sealing material SL2 by a width of the auxiliary sealing material SLa and hence, the adhesive strength of the portion can be increased.

Embodiment 4

Figure 4:
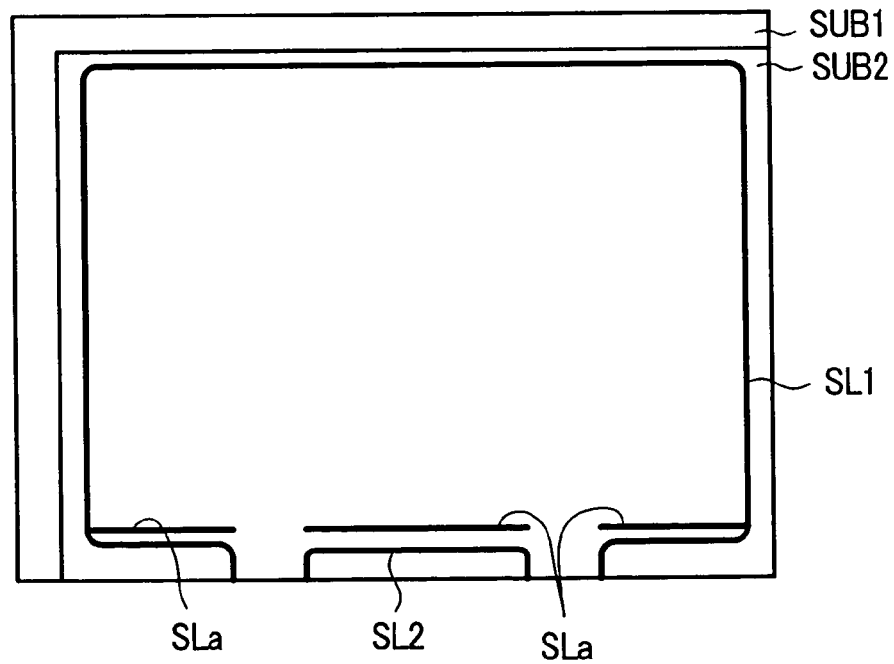
FIG. 4 is a plan view for showing another embodiment of a liquid crystal display device according to the present invention.

FIG. 4 is a constitutional view showing another embodiment of the liquid crystal display device according to the present invention and corresponds to FIG. 2.

The constitution which makes this embodiment different from the embodiment shown in FIG. 2 lies in that to the sealing materials SL at the side in which respective liquid crystal filling ports INJ are formed, auxiliary sealing materials SLa are formed close to the liquid crystal sides of the sealing materials SL. In other words, the provision of the auxiliary sealing material SLa is not limited to the sealing material SL2 having the short length out of the sealing materials SL which connect between the respective liquid crystal filling ports INJ, the auxiliary sealing materials SLa are also provided to other sealing material SL1 on the side in which respective liquid crystal filling ports INJ are formed.

Not to mention the advantageous effect obtained by the constitution shown in FIG. 2, with respect to the sealing material SL1 having the long length out of the sealing materials SL which connect between respective liquid crystal filling ports INJ, it is also possible to prevent the peeling-off of the sealing material SL1 in the vicinities of respective liquid crystal filling ports INJ.

Embodiment 5

Figure 5:
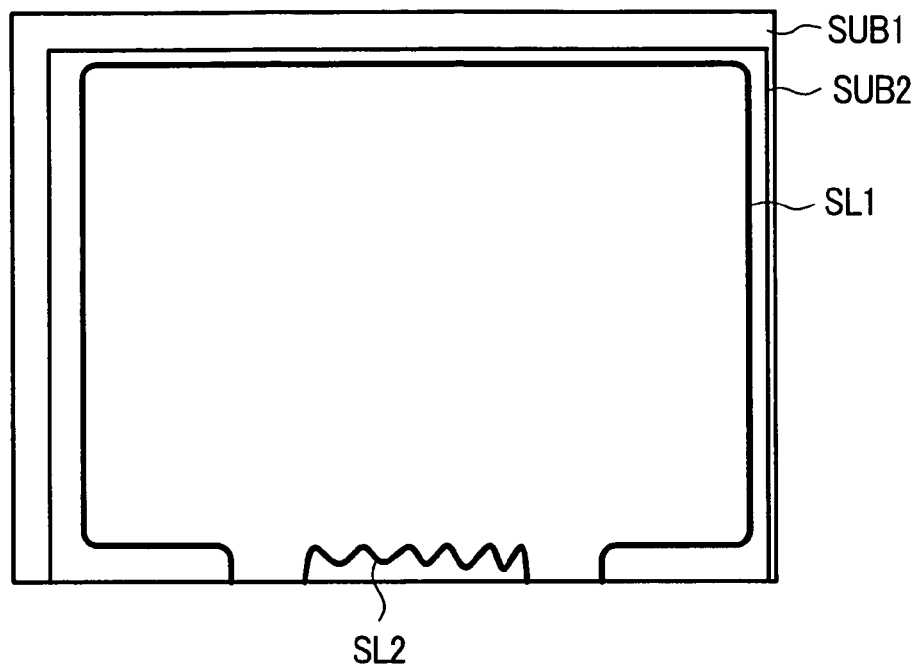
FIG. 5 is a plan view for showing another embodiment of a liquid crystal display device according to the present invention.

FIG. 5 is a constitutional view showing another embodiment of the liquid crystal display device according to the present invention and corresponds to FIG. 1.

The constitution which makes this embodiment different from the embodiment shown in FIG. 1 lies in that out of the sealing materials SL which connect between respective liquid crystal filling ports INJ, the sealing material SL2 having the short length is formed in a pattern which is referred to as a wave form or a zigzag form.

This pattern is provided for the purpose of ensuring the substantial increase of the length of the sealing material SL2. Accordingly, it is needless to say that the shape of the sealing material SL2 is not limited to the wave form and the sealing material SL2 may be formed in a repeated crest shape pattern.

That is, by constituting the sealing material SL2 using the pattern which is formed of a locus which sequentially moves to the left side and the right side with respect to an imaginary straight line which connects respective liquid crystal filling ports INJ, it is possible to realize the above-mentioned purpose.

Due to such a constitution, out of the sealing materials SL which connect between respective liquid crystal filling ports INJ, the sealing material SL2 having the short length can be formed such that the length thereof is substantially elongated and hence, the adhesive strength can be enhanced.

Embodiment 6

Figure 6:
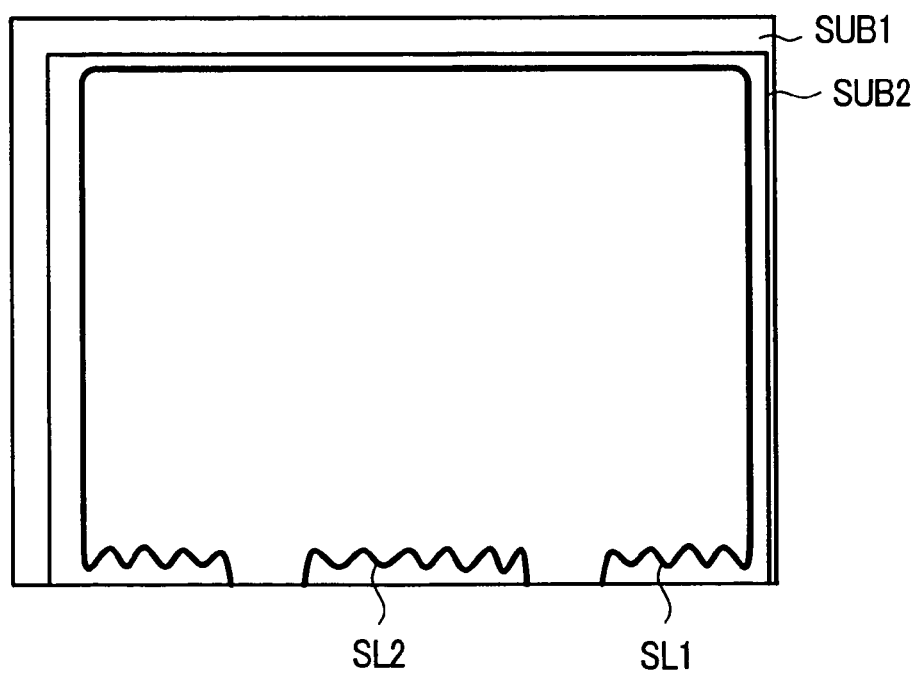
FIG. 6 is a plan view for showing another embodiment of a liquid crystal display device according to the present invention.

FIG. 6 is a constitutional view showing another embodiment of the liquid crystal display device according to the present invention and corresponds to FIG. 5.

The constitution which makes this embodiment different from the embodiment shown in FIG. 5 lies in that the sealing materials SL1 and SL2 on the side in which respective liquid crystal filling ports INJ are formed are formed in a waveform pattern or a zigzag pattern.

That is, the provision of the waveform or zigzag pattern is not limited to the sealing material SL2 having the short length out of the sealing materials SL which connect between respective liquid crystal filling ports INJ, the waveform pattern or the zigzag pattern is provided to other sealing material SL1 on the side in which respective liquid crystal filling ports INJ are formed.

In this case, it is needless to say that the sealing materials SL1 and SL2 are not limited to the waveform pattern or the zigzag pattern and the sealing materials SL1 and SL2 may be formed in a pattern having a locus which sequentially moves to both sides with respect to an imaginary line.

Embodiment 7

Figure 7A:
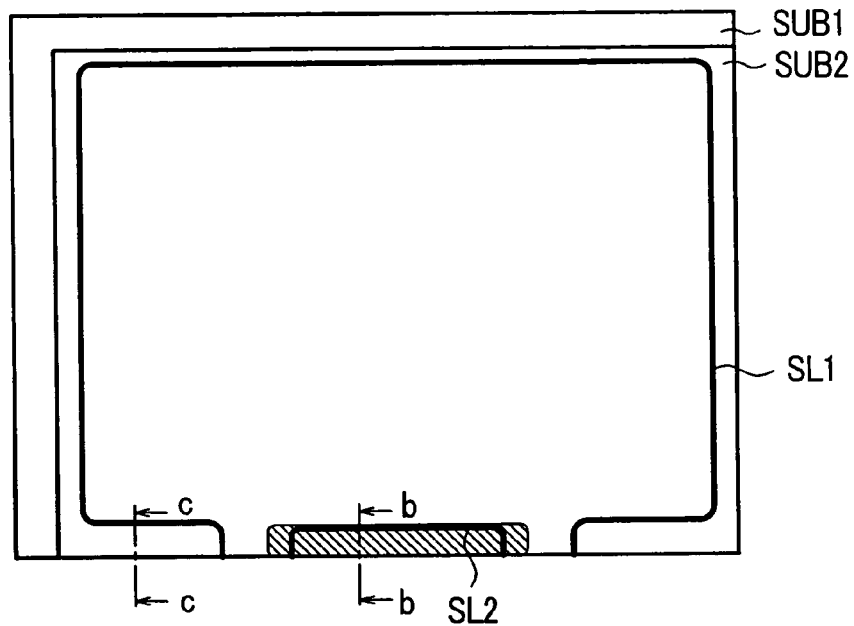
FIG. 7 is a constitutional view for showing another embodiment of a liquid crystal display device according to the present invention.
Figure 7B:
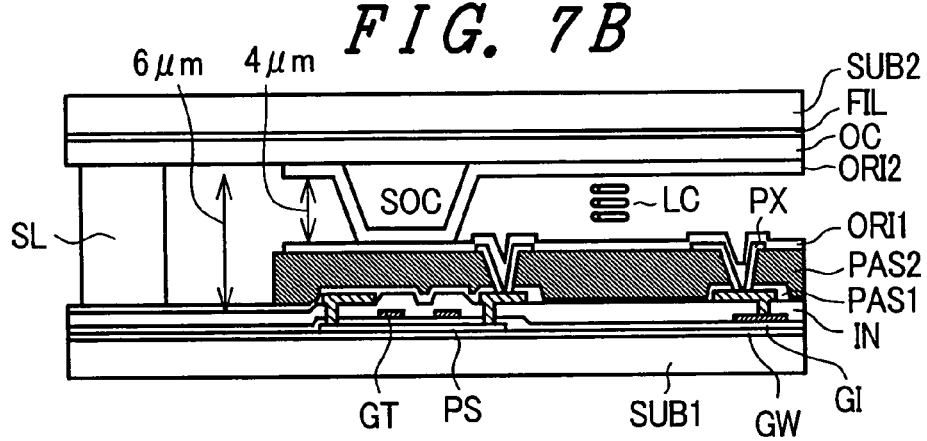
Figure 7C:
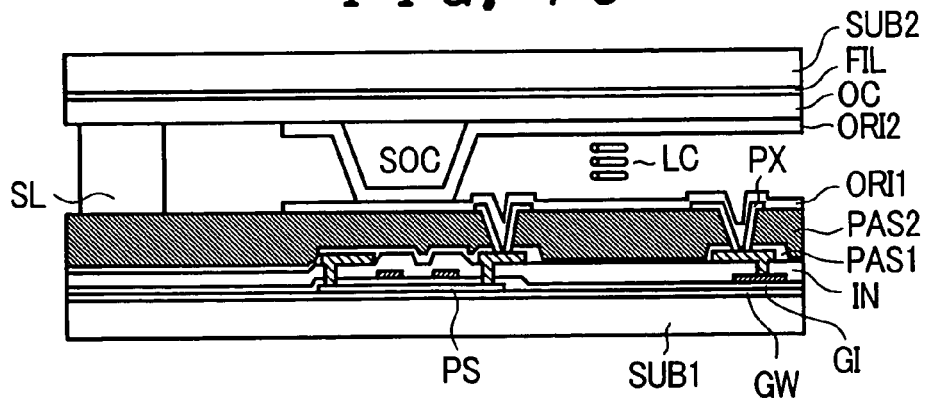

FIG. 7 is a constitutional view showing another embodiment of the liquid crystal display device according to the present invention. FIG. 7A is a plan view, FIG. 7B is a cross-sectional view taken along a line b—b in FIG. 7A and FIG. 7C is a cross-sectional view taken along a line c—c in FIG. 7A.

In this embodiment, a protective film which is constituted of an organic material layer is formed over the whole area of the liquid-crystal-side surface of the transparent substrate SUB1. Further, a portion of the protective film on which the sealing material SL2 having the short length out of the sealing materials SL which connect between respective liquid crystal filling ports INJ is formed or a portion thereof in the vicinity (indicated by hatching in the drawing) of the sealing material SL2 are removed.

Due to such a constitution, the sealing material SL2 is adhered to the transparent substrate SUB1 side without interposing the organic material layer but by interposing an inorganic material layer such as a silicon nitride film (for example, SiN), for example, and hence, the adhesive strength of the sealing material to the transparent substrate SUB1 can be increased.

Here, the protective film is, as one object thereof, provided for preventing the degradation of characteristics of the thin film transistor TFT by obviating a direct contact of a thin film transistor TFT with the liquid crystal. However, by using the organic protective film as a material of the protective film, it is possible to level the surface of the protective film whereby it is possible to obtain an advantageous effect that a parasitic capacitance generated between respective signals lines formed on an upper layer and a lower layer by way of an organic protective film can be reduced.

Here, in conjunction with FIG. 7B, the constitution of the liquid-crystal-side surface of the transparent substrate SUB1 is briefly explained by mainly focusing on the thin film transistor TFT, the protective film and the like.

A semiconductor layer of the thin film transistor TFT used by the liquid crystal display device is formed of poly-crystalline silicon (poly-Si).

First of all, on the surface of the transparent substrate SUB1, a background layer GW which is made of SiN, for example, is formed. This background layer GW is formed for obviating the possibility that ionic impurities contained in the transparent substrate SUB1 influences the thin film transistor TFT explained later.

Then, on the surface of the background layer GW, a semiconductor layer PS formed of a polysilicon layer is formed. The semiconductor layer PS is, for example, formed by poly-crystallizing an amorphous Si film which is formed by a plasma CVD device using eximer laser beams. The semiconductor layer PS is formed as a semiconductor layer of the thin film transistor TFT which will be explained later.

Then, on a surface of the transparent substrate SUB1 on which the semiconductor layers PS are formed, a first insulation film GI which is made of $SiO_2$ or SiN, for example, is formed such that the first insulation film GI also covers the semiconductor layers PS.

Then, on an upper surface of the first insulation film GI, gate signal lines GL and gate electrodes GT which are connected to the gate signal lines GL are formed such that the gate electrodes GT cross the approximately center portions of the semiconductor layers PS.

After forming the gate signal lines GL, the ion implantation of impurities is made through the first insulation film GI so as to make regions of the semiconductor layers PS except for portions thereof right below the gate electrodes GT conductive whereby source regions and drain regions of the thin film transistors TFT are formed.

Further, on an upper surface of the first insulation film GI, a second insulation film IN made of $SiO_2$ or SiN, for example, is formed such that the second insulation film IN also covers the gate signal lines GL and the gate electrodes GT.

On an upper surface of the second insulation film IN, the drain signal lines DL are formed, wherein portions of the drain signal lines DL are connected to the drain regions of the thin film transistors TFT via through holes formed in the second insulation film IN and the first insulation film GI.

Further, simultaneously with the formation of the drain signal lines DL, the source electrodes of the thin film transistors TFT are formed, wherein the source electrodes are connected with the source regions of the thin film transistors TFT via through holes formed in the second insulation film IN and the first insulation film GI. The source electrodes are connected to the pixel electrodes described later and are formed in a pattern which includes extension portions for such a connection.

On a surface on which the drain signal lines DL and the source electrodes are formed, a first protective film PAS1 which is formed of an inorganic material layer made of a silicon nitride film (SiN), for example, is formed such that the first protective film PAS1 forms over the drain signal lines DL and the source electrodes. Further, on an upper surface of the first protective film PAS1, a second protective film PAS2 which is formed of an organic material layer made of resin, for example, is formed.

Then, the pixel electrodes PX are formed on a surface of the second protective film PAS2 and the pixel electrodes PX are connected with extension portions of the source electrodes via through holes formed in the second protective film PAS2 and the first protective film PAS1.

Here, the pixel electrode PX generates an electric field between the pixel electrode PX and a counter electrode (not shown in the drawing) which is formed on the surface of the second protective film PAS2 or below the second protective film PAS2 and the optical transmissivity of the liquid crystal is controlled by the electric field.

Further, on the surface of the second protective film PAS2 on which the pixel electrodes PX are formed, an orientation film ORI1 is formed such that the orientation film ORI1 also covers the pixel electrodes PX. The orientation film ORI1 determines the initial orientation direction of the liquid crystal which is brought into contact with the orientation film ORI1.

On the other hand, on a liquid-crystal-side surface of the transparent substrate SUB2, color filters FIL, a leveling film OC and an orientation film ORI2 are sequentially formed.

Here, it is needless to say that when the color filters FIL and the leveling film OC are formed of a resin film, the resin film on portions of these parts on which the sealing material having the short length out of the sealing materials which connect between respective liquid crystal filling ports INJ is formed or the resin film in the vicinities of the portions may be removed.

Further, to a liquid crystal display part AR which is defined between the transparent substrates SUB1, SUB2 and is surrounded by the sealing materials SL, to ensure a gap defined between respective transparent substrates SUB1 and SUB2, columnar spacers (indicated by symbol SOC in FIG. 7A and FIG. 7B, for example) which are formed on one substrate side are provided. When the spacers must be formed within regions where the protective film is removed, it is preferable to make the protective film remain in only portions which are brought into contact with the spacers.

Embodiment 8

Figure 8:
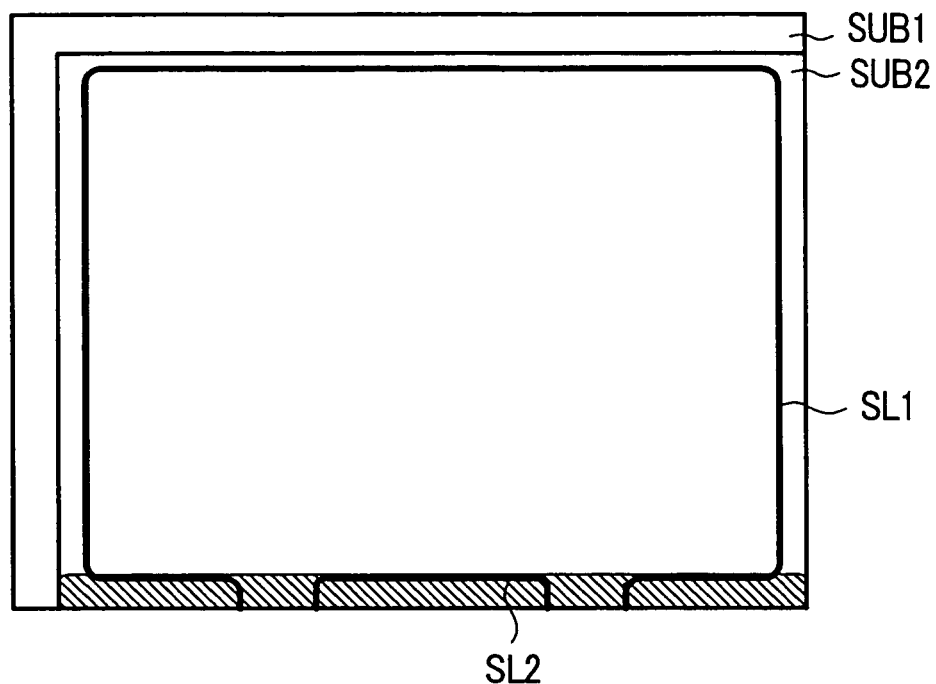
FIG. 8 is a plan view for showing another embodiment of a liquid crystal display device according to the present invention.

FIG. 8 is a plan view showing another embodiment of the liquid crystal display device according to the present invention and corresponds to FIG. 7A.

The constitution which makes this embodiment different from the embodiment shown in FIG. 7A lies in that the removal of the second protective film PAS2 which is formed of the organic material layer is performed not only with respect to the sealing material SL2 having the short length out of the sealing materials SL which connect between the respective liquid crystal filling ports INJ but also with respect to other sealing material SL1 on the side in which respective liquid crystal filling ports INJ are formed.

In the drawing, a region where the second protective film PAS2 is removed is indicated by hatching.

Not to mention the advantageous effect obtained by the embodiment shown in FIG. 7A, out of the sealing materials which connect between respective liquid crystal filling ports INJ, it is also possible to prevent the peeling-off of the sealing material which has the long length and is arranged in the vicinities of the respective liquid crystal filling ports INJ.

Embodiment 9

Figure 9:
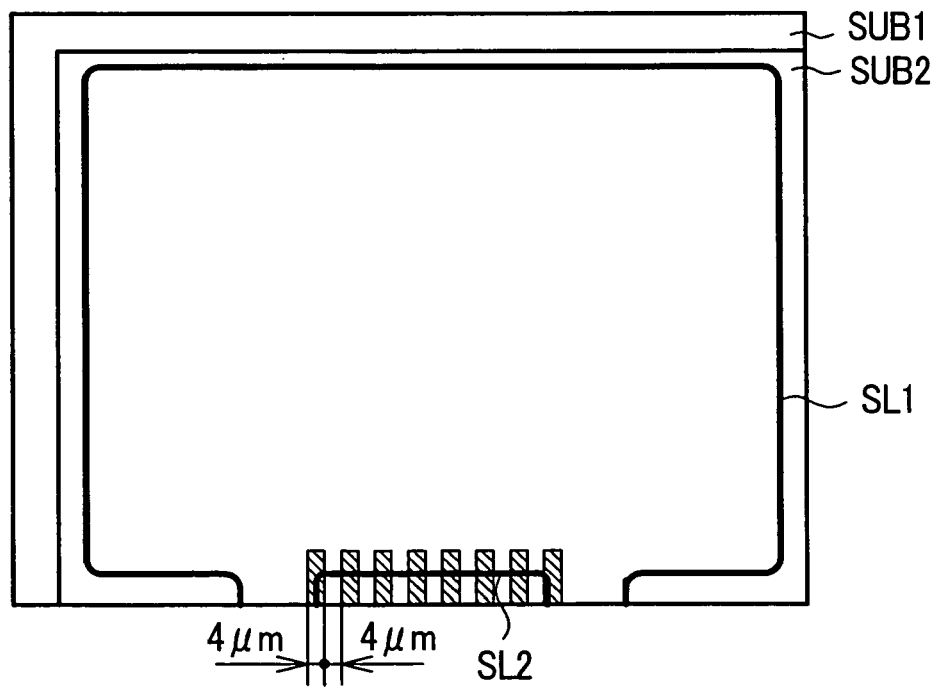
FIG. 9 is a plan view for showing another embodiment of a liquid crystal display device according to the present invention.

FIG. 9 is a constitutional view showing another embodiment of the liquid crystal display device according to the present invention and corresponds to FIG. 7B.

In the same manner as the embodiment shown in FIG. 7A, the second protective film PAS2 which is formed of the organic material layer is formed on the liquid-crystal-side surface of the transparent substrate SUB1. However, this embodiment is characterized in that with respect to the second protective film PAS2, in portions thereof corresponding to the sealing material SL2 having the short length out of the sealing materials SL which connect between respective liquid crystal filling ports INJ, grooves (indicated by hatching in the drawing) which cross the sealing material SL2 are formed in parallel in the direction of the sealing material SL2.

It is preferable that, for example, a width of the groove is set to about 4 µm and a spaced-apart distance between the groove and another neighboring groove is set to about 4 µm.

Also due to such a constitution, it is possible to reduce portions of the sealing material SL2 which are brought into contact with the organic material layer and hence, portions of the sealing material SL2 which are adhered to the inorganic material layer is increased whereby the adhesive strength can be enhanced.

The removal of the second protective film PAS2 which has such a constitution makes it unnecessary to form hole portions having a relatively large area in the liquid-crystal-side surface of the transparent substrate SUB1. In other words, a large number of small hole portions (the above-mentioned grooves) are formed. This implies that in arranging spacers (bead-like spacers or columnar spacers which are fixed to one substrate side) for ensuring the gap between the transparent substrate SUB1 and the transparent substrate SUB2, the spacers are not fitted into the hole portions and hence, a function of the spacers is not damaged.

Embodiment 10

Figure 10:
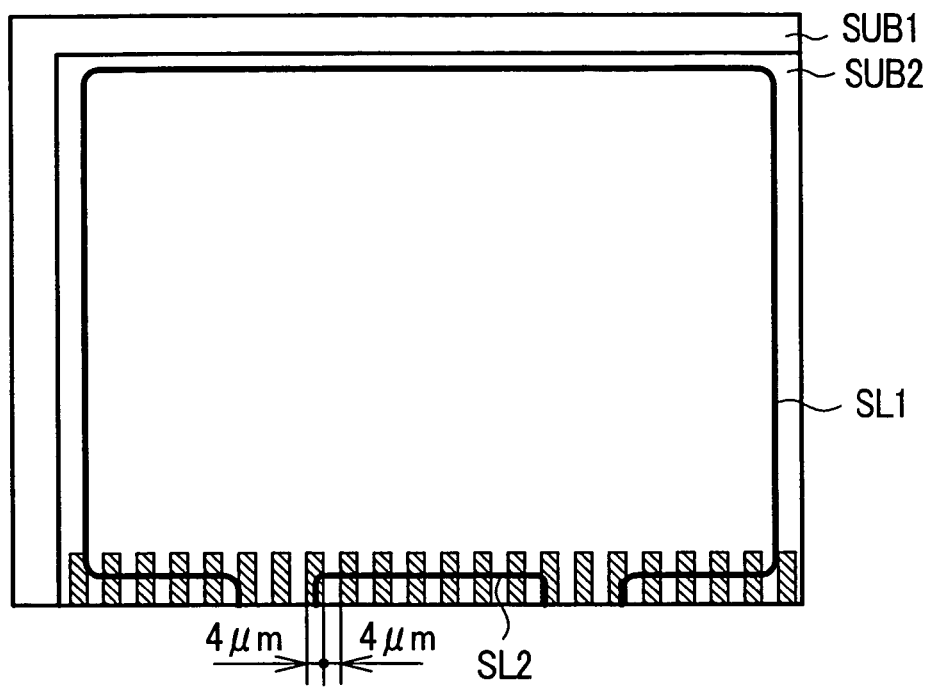
FIG. 10 is a plan view for showing another embodiment of a liquid crystal display device according to the present invention.

FIG. 10 is a constitutional view showing another embodiment of the liquid crystal display device according to the present invention and corresponds to FIG. 9.

The constitution which makes this embodiment different from the embodiment shown in FIG. 9 lies in that a large number of grooves formed in the second protective film PAS2 are not only formed in the sealing material SL2 portion having the short length out of the sealing materials SL which connect between respective liquid crystal filling ports INJ but also in other sealing material portion SL1 on the side in which respective liquid crystal filling ports INJ are formed.

Not to mention the advantageous effect obtained by the embodiment shown in FIG. 7A, out of the sealing materials which connect between respective liquid crystal filling ports INJ, it is also possible to prevent the peeling-off of the sealing material SL1 which has the long length and is arranged in the vicinities of the respective liquid crystal filling ports INJ.

Embodiment 11

Figure 11:
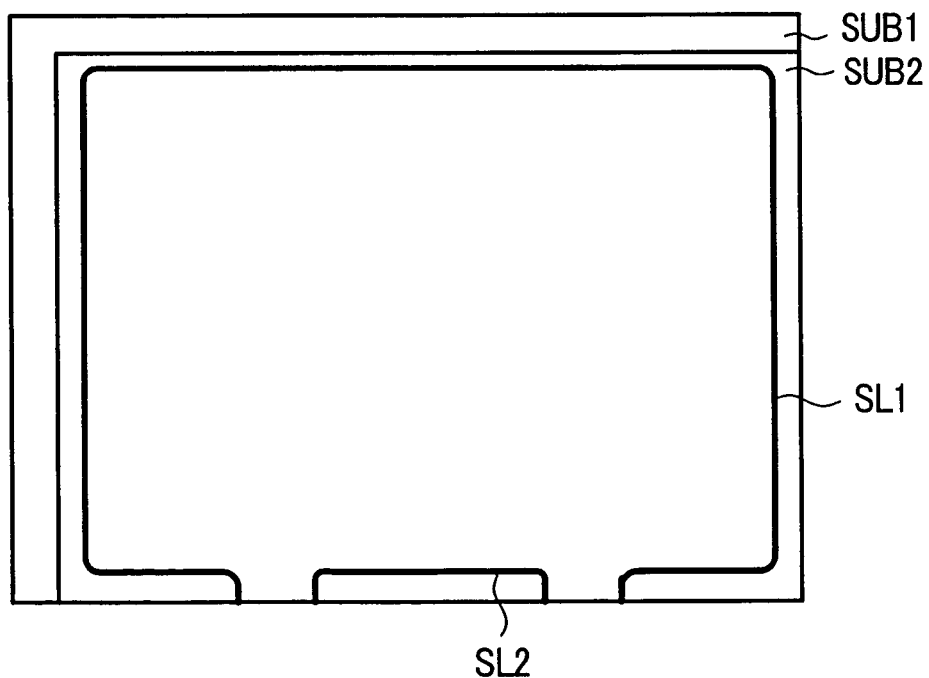
FIG. 11 is a plan view for showing another embodiment of a liquid crystal display device according to the present invention.

FIG. 11 is a constitutional view showing another embodiment of the liquid crystal display device according to the present invention and corresponds to FIG. 1.

In this case, although there is substantially no difference in width between the sealing material SL2 having the short length and the sealing material SL1 having the long length out of the sealing materials SL which connect between respective liquid crystal filling ports INJ, these sealing materials SL2 and SL1 differ in material thereof.

That is, out of the sealing materials SL which connect between respective liquid crystal filling ports INJ, while the sealing material SL1 having the long length is made of an epoxy-based adhesive agent, the sealing material SL2 having the short length is made of a polyurethane-based, polysulfite-based or epoxy-based elastic adhesive agent.

In other words, out of the sealing materials SL which connect between respective liquid crystal filling ports INJ, the sealing material SL2 having the short length is made of a material having an elastic constant which is smaller than an elastic constant of other sealing material.

Due to such a constitution, it is possible to enhance the adhesive strength of the sealing material SL2 with respect to the transparent substrates SUB1 and SUB2.

Embodiment 12

Figure 12:
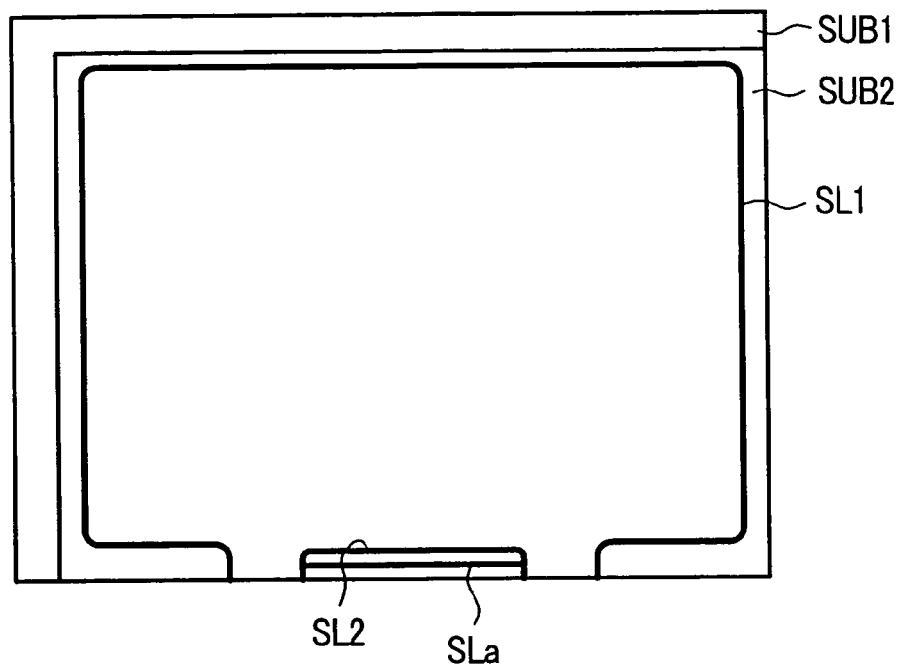
FIG. 12 is a plan view for showing another embodiment of a liquid crystal display device according to the present invention.

FIG. 12 is a constitutional view showing another embodiment of the liquid crystal display device according to the present invention and corresponds to FIG. 11.

Also in the embodiment shown in FIG. 12, out of the sealing materials SL which connect between respective liquid crystal filling ports INJ, while the sealing material SL1 having the long length is made of an epoxy-based adhesive agent, the sealing material SL2 having the short length is made of a polyurethane-based, polysulfite-based or epoxy-based elastic adhesive agent.

The constitution which makes this embodiment different from the embodiment shown in FIG. 11 lies in that the sealing material SL2 having the short length is formed in a pattern in which the sealing material SL2 includes another auxiliary sealing material SLa which is arranged parallel to the sealing material SL2 and both ends of the auxiliary sealing material SLa are connected to the sealing material SL2.

Embodiment 13

Figure 13:
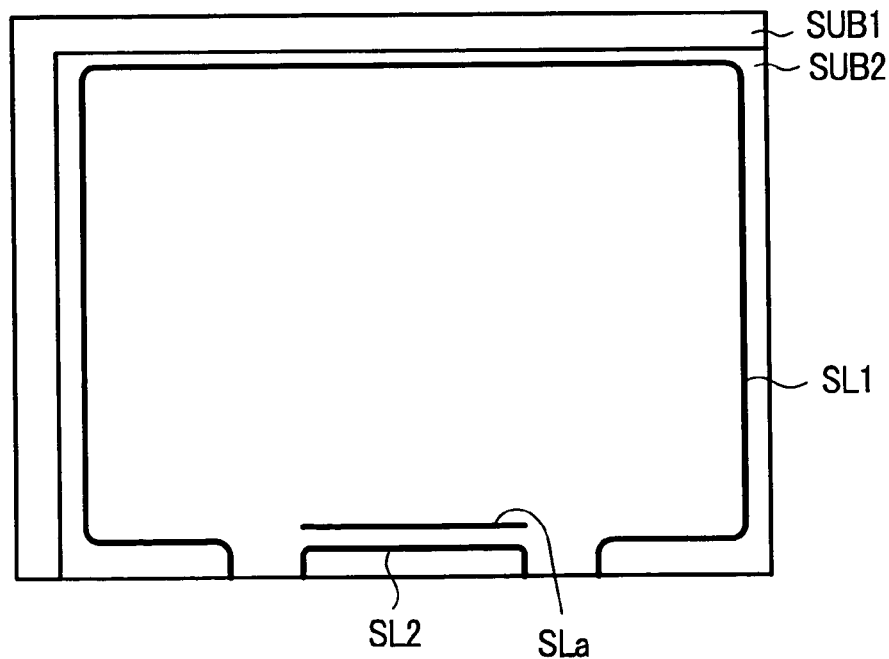
FIG. 13 is a plan view for showing another embodiment of a liquid crystal display device according to the present invention.

FIG. 13 is a constitutional view showing another embodiment of the liquid crystal display device according to the present invention and corresponds to FIG. 11.

Also in the embodiment shown in FIG. 13, out of the sealing materials SL which connect between respective liquid crystal filling ports INJ, while the sealing material SL1 having the long length is made of an epoxy-based adhesive agent, the sealing material SL2 having the short length is made of a polyurethane-based, polysulfite-based or epoxy-based elastic adhesive agent.

The constitution which makes this embodiment different from the embodiment shown in FIG. 11 lies in that the sealing material SL2 having the short length is formed in a pattern in which the sealing material SL2 includes another auxiliary sealing material SLa which is arranged parallel to the sealing material SL2 and both ends of the auxiliary sealing material SLa are not connected to the sealing material SL2.

Embodiment 14

Figure 14:
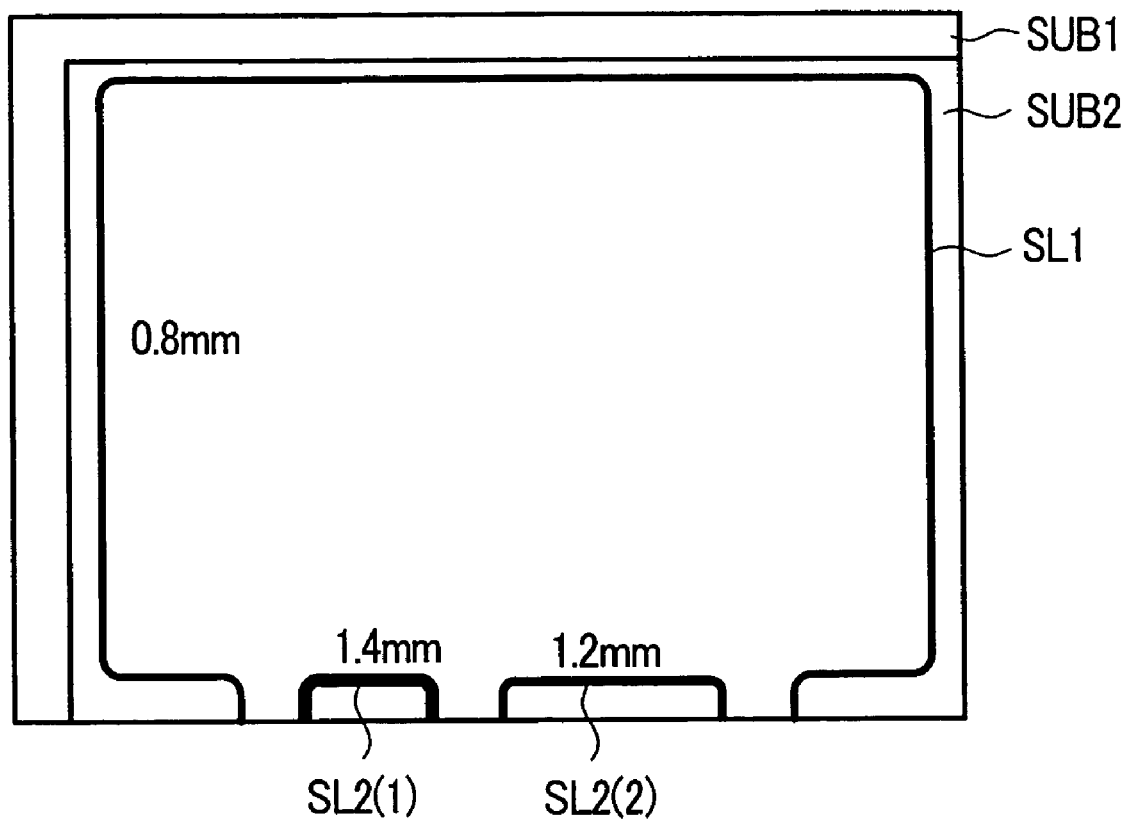
FIG. 14 is a plan view for showing another embodiment of a liquid crystal display device according to the present invention.

FIG. 14 is a view showing another embodiment of the liquid crystal display device according to the present invention. The constitution which makes this embodiment different from the foregoing embodiments lies in that three liquid crystal filling ports INJ are formed.

In this case, although the number of respective sealing materials which connect respective liquid crystal filling ports INJ is set to three, the respective widths of the sealing materials are increased inversely corresponding to the lengths of the sealing materials.

For example, as shown in the drawing, the width of the sealing material SL2 (1) having the shortest length is set to 1.4 mm, the width of the sealing material SL2(2) having the next short length is set to 1.2 mm and the width of the sealing material SL1 having the longest length is set to 0.8 mm The above-mentioned respective embodiments may be used either in a single form or in combination. This is because the advantageous effects of respective embodiments can be obtained in a single form or in combination.

As can be clearly understood from the foregoing explanation, according to the present invention, it is possible to form the sealing materials in a reliable manner without generating the peeling-off of the sealing materials.

What is claimed is:

1. A display device comprising:
a pair of substrates,
a liquid crystal layer interposed between said pair of substrates surrounded by sealing materials,
wherein said sealing materials are divided into at least two sealing materials with at least two ports, and
wherein auxiliary sealing material is formed in the vicinity of the shortest length sealing material of said divided sealing materials.

2. A display device according to claim 1,
wherein said auxiliary sealing material is formed in parallel with said shortest length sealing material.

3. A display device according to claim 1,
wherein said auxiliary sealing material is formed along said shortest length sealing material formed side.

4. A display device according to claim 1,
wherein said auxiliary sealing material is connected to said shortest length sealing material.

5. A display device according to claim 4,
wherein at least one end of said auxiliary sealing material is connected to at least one end of said shortest length sealing material.

6. A display device according to claim 5,
wherein each end of said auxiliary sealing material is connected to each end of said shortest length sealing material.

7. In a display device being constituted such that between respective substrates which are arranged to face each other with liquid crystal inserted therebetween, sealing materials are formed to fix one substrate to another substrate while being used for sealing the liquid crystal therebetween and a plurality of liquid crystal filling ports are formed in the sealing materials,
wherein in a vicinity of a liquid crystal side of the sealing materials having the shortest length out of respective sealing materials which connect between respective liquid crystal filling ports, an auxiliary sealing material is formed in parallel with the sealing materials.

8. A display device according to claim 1, wherein at least both ends of the auxiliary sealing material are connected to the sealing materials.

* * * * *